Feb. 23, 1937. J. D. HARRIS 2,071,877
NONREFILLABLE BOTTLE
Filed Dec. 13, 1935
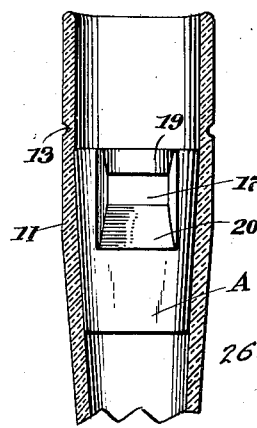
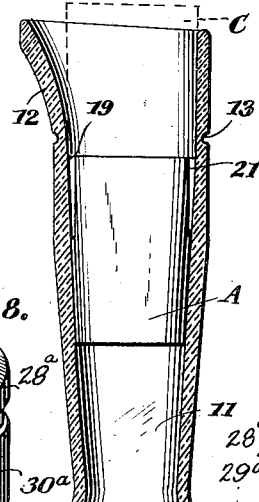
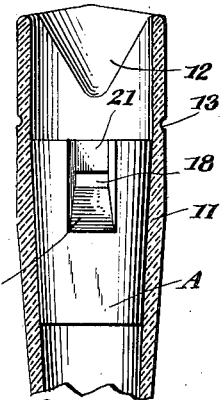
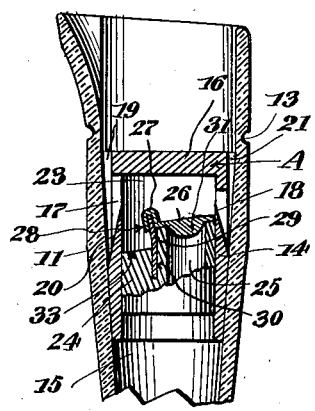
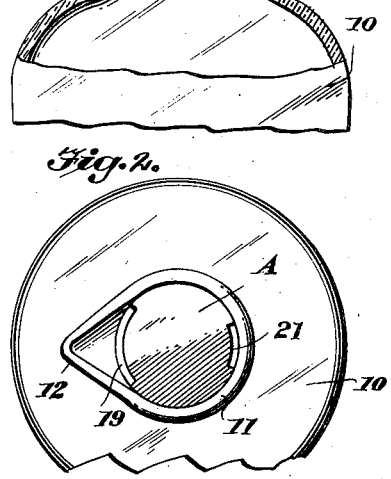
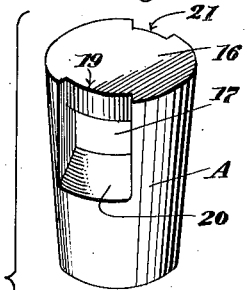
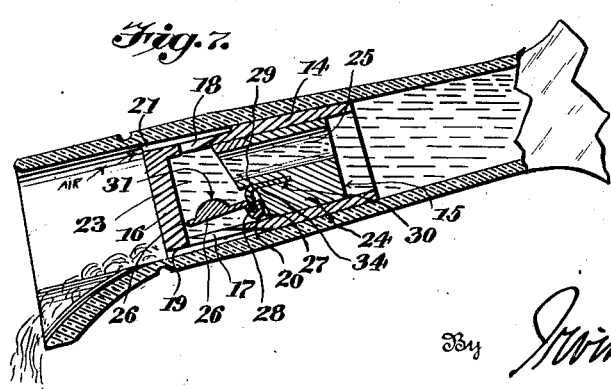
Inventor
JEFFERSON D. HARRIS
By Irving R. M. Cathran
Attorney Patented Feb. 23, 1937

2,071,877

UNITED STATES PATENT OFFICE 2,071,877

NONREFILLABLE BOTTLE

Jefferson D. Harris, Washington, D. C., assignor of one-half to Angelo B. Bovello, Washington, D. C.

Application December 13, 1935, Serial No. 54,344

3 Claims. (Cl. 215—24)

This invention relates to non-refillable bottles and has for its object the production of a simple and efficient non-refillable bottle which is so constructed as to prevent the refilling of the bottle after the contents of the bottle have once been emptied therefrom.

Another object of this invention is the production of a simple and efficient valve and shield casing constituting means for preventing the refilling of a bottle, this valve and shield casing being firmly secured within the neck of the bottle in a manner to prevent the opening of the valve except for the purpose of pouring liquid from the bottle.

A further object of this invention is the production of a simple and efficient valve casing for use in connection with non-refillable bottles, the valve casing supporting a hinged valve, the hinged valve being secured to the valve casing by means of a resilient hinge member and mounted in a manner to swing away from the opening in the valve casing.

Other objects and advantages will appear throughout the following specification and claims.

In the drawing:—

Figure 1 is a fragmentary side elevation of a bottle, a portion of the neck being shown in section and illustrating the shield casing in side elevation;

Figure 2 is a top plan view of a bottle showing the non-refillable means in position;

Figure 3 is a vertical sectional view taken on line 3—3 of Figure 2;

Figure 4 is a vertical sectional view through the neck of a bottle, the shield casing being shown in front elevation and illustrating the pouring aperture formed in this shield casing;

Figure 5 is a vertical sectional view through the neck of a bottle illustrating the non-refillable means in position, this figure being taken looking at the opposite side of the non-refillable means to that as illustrated in Figure 4;

Figure 6 is a perspective view of the two sections constituting the non-refillable means embodying the outer shield casing and the valve casing;

Figure 7 is an enlarged longitudinally sectional view of the neck of the bottle and illustrating the non-refillable means in an open position;

Figure 8 is a perspective view of a modified form of the valve casing of the non-refillable means; and Figure 9 is a vertical sectional view through the valve casing of the modified form shown in Figure 8.

By referring to the drawing, it will be seen that 10 designates the bottle which is provided preferably with an elongated restricted neck 11 having an outer pouring spout 12 at its outer end. The neck 11 is preferably provided with a channeled or weakened portion 13 near its outer end preferably located just above the non-refillable means A. The non-refillable means A is mounted within the neck of the bottle and comprises a glass outer shield casing 14 preferably of a tapering tubular-like structure having an open lower end 15 and a closed upper end 16. The shield casing 14 is provided upon one side with a pouring aperture 17 and upon its diametrically opposite side with a vent aperture 18. The pouring aperture 17 is relatively shallow at its outer end to provide a restricted mouth 19 along the side marginal edge of the closed top portion 16 of the shield casing 14. The lower end of the pouring aperture 17 is provided with a beveled wall 20 which beveled wall is inclined downwardly from the interior of the shield casing 14 toward the exterior thereof. The pouring aperture 17 is preferably relatively wide with respect to the vent aperture 18 being located diametrically opposite the pouring aperture 17, as shown in Figure 3. The upper end of the vent aperture 18 is relatively shallow in depth to provide a relatively narrow vent opening 21, as shown in Figure 3. The bottom end of the vent aperture 18 is inclined, as at 22, the bottom 22 being inclined downwardly from the interior of the shield casing 14 toward the exterior thereof. This shield casing 14 is preferably firmly secured to the inner face of the neck 11, of the bottle, in any suitable or desired manner, efficient glass cement being preferably employed.

This shield casing 14 is provided with a compartment 23 within which is securely fitted the tubular valve casing 24, which valve casing 24 is preferably formed of glass, the shield casing 14 also being preferably formed of glass. The valve casing 24 is preferably firmly secured within the shield casing 14 by means of glass cement or in any other suitable manner. The valve casing 24 is provided with a longitudinally extending bore 25 which is preferably arranged off center and toward one side of the valve casing 24. The valve casing 24 preferably tapers toward its upper end and the bore 23 also preferably tapers toward its upper end slightly to permit the valve casing 24 to firmly wedge in position and provide through the medium of the securing cement or other securing means, a firm and tight fit.

A specially constructed valve 26 is used in connection with the valve casing 24 and this valve comprises a flat cap-like structure having an upturned flange 27, the upturned flange 27 being provided with a socket 28 within which a resilient hinge strip 29 is securely cemented or fastened. This resilient hinge strip 29 also extends down into a slot 30 formed in the valve casing 24 and is cemented or otherwise secured therein, the hinge strip 30 being preferably formed of surgical rubber which will not deteriorate under the action of alcohol or similar liquids. Furthermore, this resilient hinge strip 30 by being formed of surgical rubber will retain its flexibility and permit of a freedom of action of the valve 26 to swing to and from a closed position and thereby prevent interference with the operation of the valve. The valve 26 may preferably be formed of glass and it is provided with an enlargement 31 upon its lower face to provide additional weight, the enlargement 31 preferably being of a knob-like structure to guide the valve to a seating position in the outer discharge end of the bore 25, as shown in Figure 3, when the bottle is moved to a vertical position.

The valve casing 24 is provided with a projecting collar 32 which extends around the upper end of the bore 25 and projects above the upper end of the casing 24. The casing 24 is provided with a ledge 33 located to one side of the collar 32 and located at a substantial distance below the upper edge of the collar 32 and also below the upper edge of the casing 24, as shown in Figures 3, 7 and 6. This will allow the flexible hinge 29 to flex definitely away from the collar 32 when the valve 26 swings to an open position to completely clear the valve away from the outer end of the bore 25, thereby allowing the liquid to freely flow. The bend of the flexible hinge 29 will occur at the point indicated by the numeral 34, in Figure 7, which is below or inset with respect to the outer end of the collar 32, and the flexible nature of this hinge will cause the valve to immediately seat itself since it will swing back to the position shown in Figure 3 as soon as pressure is released from the valve, the seating being assisted by the knob 31.

It should be understood that the restricted mouth 19 of the pouring aperture 17, and the restricted outer end 21 of the vent opening, are so arranged as to provide relatively shallow elongated slots adjacent the inner wall of the neck of the bottle to prevent the insertion of any type of tool for the purpose of opening the valve 26. The inclined lower ends 20 and 22 will tend to prevent the entrance of the end of a tool into the interior of the shield casing 14, thereby preventing anyone from tampering with the valve 26. Furthermore should pressure be used in an effort to refill the bottle, the pressure will cause the valve 26 to be immediately forced upon its seat, and should vacuum be employed in an effort to refill the bottle, the vacuum will naturally suck the valve 26 to its closed position.

However, by inclining the neck of the bottle to the position shown in Figure 7, liquid may be extracted from the bottle since the valve 26 will swing to an open position, and the liquid will pass through the bore 25 and out through the pouring aperture 17, in the manner as shown in Figure 7, the air entering the vent aperture 18 in the direction of the arrows, as shown in Figure 7. By carefully considering Figure 7 in detail, it will be seen that the edges of the valve 26 are rounded, as at 26', so as to provide a surface against which an implement may not easily contact, for the purpose of opening the valve. Furthermore, it will be noted that the provision of the weakened portion 13 around the neck of the bottle would enhance the danger of breaking the neck of the bottle if it should be attempted to force an instrument down into either the pouring aperture 17 or the vent aperture 18, any slight pressure upon such an instrument tending to snap the end of the bottle and break the same along the scored or weakened portion 13 located just above the non-refillable means A.

A suitable cork or stopper C, may be used if desired, to close the outer end of the bottle.

Figures 8 and 9 show a modified form of valve casing wherein a casing 24a is illustrated having an L-shaped slot 30a formed therein, in which is embedded the rubber hinge member 29a, the rubber hinge member being fitted within the notched portion 28a of the valve 26a. The L-shaped slot 30a will constitute efficient means for anchoring the lower end of the rubber hinge member 29a in position. This structure is especially adapted for use where the valve and valve casing are formed of glass. It should be understood that while it is not desired to limit the invention to any particular type of material used, so far as the valve casing, valve and shield are concerned, these parts may if desired be formed of glass, porcelain, or any other suitable material without departing from the spirit of the invention.

Certain detail changes in the construction may be employed without departing from the invention, so long as such changes fall within the scope of the appended claims.

Having described the invention, what I claim as new is:—

1. A non-refillable device for bottle necks comprising a shield casing having a liquid discharge opening and an air vent, a valve casing fitted within said shield casing, the valve casing having a liquid discharge bore, a flap valve normally closing the outer end of said bore, said valve having an outturned flange, the flange being slotted, said valve casing having a slot communicating with the slot formed in said flange, a resilient hinge fitted in said slots for resiliently anchoring said valve in a hinging position relative to said valve casing, said valve casing having an inset shoulder below the outer end of said bore, and said resilient hinge having its bend on a plane with said shoulder and below the outer end of said bore whereby said valve will be bodily moved away from the outer end of said bore when said valve swings to an open position.

2. A non-refillable device for bottle necks comprising a shield casing having a liquid discharge opening and an air vent, a valve casing fitted within said shield casing, the valve casing having a liquid discharge bore, a collar surrounding the outer end of said bore and extending beyond the outer end of said valve casing, a flap valve normally closing the outer end of said bore, said valve having an outturned flange, the flange being slotted, said valve casing having a slot communicating with the slot formed in said flange, a resilient hinge fitted in said slots for resiliently anchoring said valve in a hinging position relative to said valve casing, said hinge having its bend located below the outer end of said collar, said flap valve having weighted portions upon its lower face, and the weighted portion upon the lower face being of a knob-like structure to facilitate the seating of the valve in a closed position.

3. A valve mechanism for a non-refillable bottle comprising a valve casing having a longitudinally extending bore, a valve adapted to normally close the outer end of the bore, a resilient and flexible hinge secured to the valve, the valve casing having an L-shaped slot for receiving the lower end of the resilient flexible hinge and securing the flexible hinge to the valve casing, the valve casing being cut away below its upper end on one side to allow the flexible hinge to swing away from the upper end of the valve casing and bodily move the valve away from the outer end of the bore of the casing.

JEFFERSON D. HARRIS.